United States Patent [19]

Matsushima et al.

[11] Patent Number: 4,734,334

[45] Date of Patent: Mar. 29, 1988

[54] MAGNETO-OPTICAL RECORDING MEDIUM

[75] Inventors: Masaaki Matsushima, Yokohama; Hiroyoshi Kishi; Takahiko Ishiwatari, both of Tokyo; Hisaaki Kawade, Yokohama, all of Japan

[73] Assignee: Canon Kabushiki Kaisha, Tokyo, Japan

[21] Appl. No.: 667,817

[22] Filed: Nov. 2, 1984

[30] Foreign Application Priority Data

Nov. 5, 1983 [JP] Japan .................. 58-207830
Nov. 5, 1983 [JP] Japan .................. 58-207831
Nov. 5, 1983 [JP] Japan .................. 58-2107833

[51] Int. Cl.$^4$ ............................ G11B 7/24
[52] U.S. Cl. .................. 428/457; 428/694; 428/900
[58] Field of Search .......... 428/694, 900, 457; 365/122; 360/131, 135

[56] References Cited

U.S. PATENT DOCUMENTS 3,965,463 6/1976 Chaudhari et al. .......... 340/174 TF
4,202,022 5/1980 Imamura et al. .............. 360/114

FOREIGN PATENT DOCUMENTS 108304 6/1984 Japan .
2071696 9/1981 United Kingdom .

OTHER PUBLICATIONS

Aratari et al; Journal of Applied Physics, vol. 57(1) 1985 p 3903.
Taylor et al; Journal of Applied Physics, vol. 48(1) 1977 p 358.

Primary Examiner—George F. Lesmes
Assistant Examiner—William M. Atkinson
Attorney, Agent, or Firm—Fitzpatrick, Cella, Harper & Scinto

[57] ABSTRACT

This specification discloses a magneto-optical recording medium having an amorphous magnetic alloy film comprising the following composition and having a readily magnetizable axis in a direction perpendicular to the surface of the film:

$$\{(Gd_xTb_{1-x})_p(Fe_yCo_{1-y})_{1-p}\}_q(Ni_zCr_{1-z})_{1-q},$$

where
$0 \leq x \leq 0.9$
$0.2 \leq y \leq 1.0$
$0.05 \leq z \leq 1.0$
$0.1 \leq p \leq 0.5$
$0.001 \leq 1-q \leq 0.35$.

3 Claims, 8 Drawing Figures

MAGNETO-OPTICAL RECORDING MEDIUM

BACKGROUND OF THE INVENTION

1. Field of the Invention

This invention relates to a magneto-optical recording medium used with a magneto-optical memory, a magnetic recording and display element or the like and capable of reading out information by the use of a magneto-optic effect such as magnetic Kerr effect or Faraday effect, and particularly to a magnetic thin film recording medium having improved corrosion resistance.

2. Description of the Prior Art

Polycrystal thin films such as MnBi and MnCuBi, amorphous thin films such as GdCo, GdFe, TbFe, DyFe, GdTbFe and TbDyFe, and single crystal thin films such as GdIG, etc. are known as magneto-optical recording mediums.

Of these thin films, the amorphous thin films have recently been considered to be excellent as magneto-optical recording mediums by taking into account of the film-making property with which a thin film of a large area is made at a temperature near the room temperature, the writing efficiency for writing signals by a little light-heat energy, the reading-out efficiency for reading out the written signals at a good S/N ratio, etc. Particularly, GdTbFe which has a great Kerr rotation angle and a curie point of about 150° C. is best suited as a magneto-optical recording medium. Further, we have studied with a view to improve the Kerr rotation angle and as a result, have found that GdTbFeCo is a magneto-optical recording medium having a sufficiently great Kerr rotation angle and capable of reading out information at a good S/N ratio.

However, poor corrosion resistance may be mentioned as a characteristic of an amorphous magnetic material such as GdTbFe or GdTbFeCo. That is, when such material contacts the atmospheric air or water vapor, not only its magnetic characteristic is reduced but also finally it is completely oxidized and becomes transparent.

Therefore, there has heretofore been proposed a disc-like recording medium in which a protective layer is provided on the recording layer or in which the recording layer is enveloped by inert gas.

SUMMARY OF THE INVENTION

It is an object of the present invention to provide a magneto-optical recording medium having a magnetic characteristic best suited for recording and reproduction of information and excellent in corrosion resistance.

The above object of the present invention is achieved by a magneto-optical recording medium having an amorphous magnetic alloy film comprising the following composition and having a readily magnetizable axis in a direction perpendicular to the surface of the film:

$$\{(Gd_xTb_{1-x})_p(Fe_yCo_{1-y})_{1-p}\}_q(Ni_zCr_{1-z})_{1-q},$$

where
$0 \leq x \leq 0.9$
$0.2 \leq y \leq 1.0$
$0.05 \leq z \leq 1.0$
$0.1 \leq p \leq 0.5$
$0.001 \leq 1-q \leq 0.35$.

DESCRIPTION OF THE PREFERRED EMBODIMENTS

Figure 1:
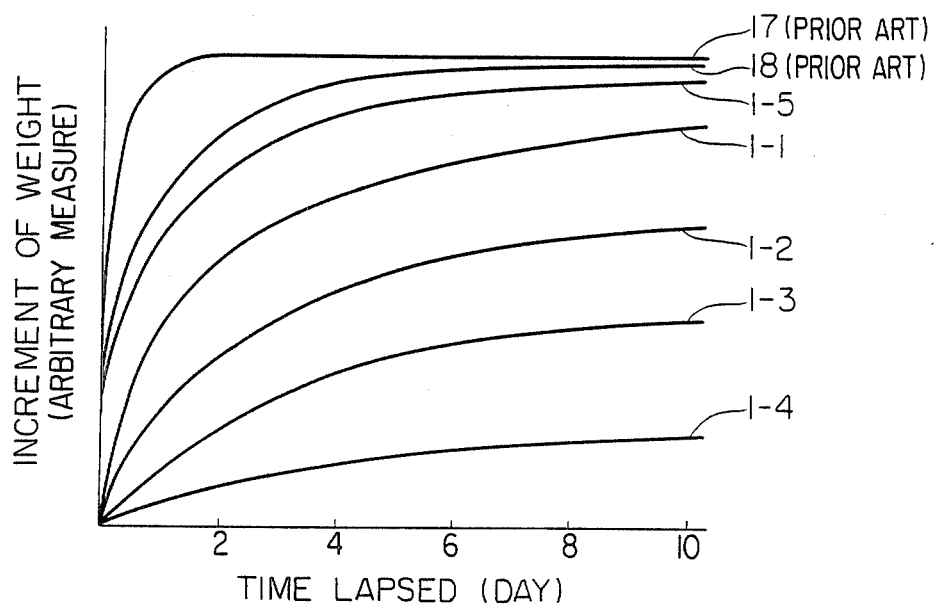
FIGS. 1 and 2 are graphs showing the results of the corrosion resistance tests of embodiments of the present invention which comprise a GdTbFeNiCr film.

The magneto-optical recording medium of the present invention has as a recording layer an amorphous magnetic alloy film having a readily magnetizable axis in a direction perpendicular to the surface of the film and is capable of accomplishing highly dense recording of information. When information is to be recorded on the recording medium of the present invention, a radiation beam modulated by an information signal is applied to the alloy film uniformly magnetized in a predetermined direction. Then the portion to which the radiation beam has been applied is heated to the curie temperature or higher, and then is cooled, whereby the information signal is recorded as a continuity of recording bit inverted in the direction of magnetization. When the thus recorded information signal is to be read out, a rectilinearly polarized light beam is caused to enter the alloy film and the light beam modulated in the direction of polarization thereof in accordance with the information is detected by the magneto-optic effect.

In the present invention, the non-crystalloid magnetic alloy film exhibits the following composition:

$$\{(Gd_xTb_{1-x})_p(Fe_yCo_{1-y})_{1-p}\}_q(Ni_zCr_{1-z})_{1-p},$$

where $0 \leq x \leq 0.9$, that is, Gd must be within the range of 0–90 atomic % relative to the total amount of Gd and Tb. If Gd exceeds 90 atomic %, the coercive force will become smaller and it will be difficult for minute recording bit to exist stably. Also, the curie temperature will become higher and therefore, compensation temperature writing severe in film forming conditions must unavoidably be used. Further, $0.2 \leq y \leq 1.0$, that is, Co must be within the range of 0–80 atomic % relative to the total amount of Fe and Co. If Co exceeds 80 atomic %, the curie temperature will again become higher and writing of signals will become difficult. From the viewpoint of such recording sensitivity, it is particularly desirable that $0.35 \leq y \leq 1.0$, that is, the amount of Co be 65 atomic % or less.

Also, in order that the magneto-optical recording medium of the present invention may have a readily magnetizable axis perpendicular to the surface of the film, transition metals (Fe, Co) and rare earth metals (Gd, Tb) must be present at a suitable composition ratio. Accordingly, it is required that $0.1 \leq p \leq 0.5$, that is, the mixture of Ge and Tb be present in the range of 10–50 atomic % relative to the total amount of Fe, Co, Gd and Tb. If this range is departed from, the readily magnetizable axis will become parallel to the surface of the film and the alloy film cannot be perpendicularly magnetized film. Further, considering the stabilization of the magnetic characteristic, it is desirable that the amount of Gd and Tb be 15-30 atomic % ($0.15 \leq p \leq 0.3$) relative to the total amount of Fe, Co, Gd and Tb.

In the present invention, to improve the corrosion resistance, it is necessary that $0.001 \leq 1-q \leq 0.35$, that is, the amount of the mixture of Ni and Cr be within the range of 0.1-35 atomic % relative to the total amount of the magnetic alloys. This is because if the amount of Ni and Cr is less than 0.1 atomic %, the corrosion resistance cannot be sufficiently improved and if the amount of Ni and Cr exceeds 35 atomic %, the magnetic characteristic will be affected and it will be difficult to obtain a perpendicularly magnetized film.

Also, the amount of Ni must be within the rnage of 5-100 atomic % ($0.05 \leq z \leq 1.0$) relative to the total amount of Ni and Cr. However, if the amount of Ni is too great, the readily magnetizable axis of the alloy will be liable to face in a direction parallel to the surface of the film due to the ferromagnetic property of Ni. Therefore, it is desirable that the amount of Ni be 30 atomic % or less relative to the total amount of the alloy. Accordingly, the preferable amount of Ni is in the range of 20-90 atomic % ($0.2 \leq z \leq 0.9$) relative to the total amount of Ni and Cr. Further, with regard to the corrosion resistance, a good result has been obtained when the amount of Ni is within the range of 60-80 atomic % ($0.6 \leq z \leq 0.8$) relative to the total amount of Ni and Cr.

From the foregoing description, it will be seen that the chemical compositions of especially preferable material are GdTbFeNiCr, TbFeCoNiCr and GdTbFeCoNiCr. TbFeNiCr would also occur to mind, but this composition is more or less susceptible to thermal influence because the curie temperature thereof is as low as 100°-120° C. GdTbFeNiCr has a suitable curie temperature (150°-200° C.), a relatively great Kerr rotation angle (0.25°-0.27°) and a great coercive force and therefore is suitable for high-density recording for forming minute recording bit. Also, TbFeCoNiCr has a suitable curie temperature and a great Kerr rotation angle of 0.3°. GdTbFeCoNiCr has a greater Kerr rotation angle of 0.35°-0.45° and is a material excellent in reading-out characteristic.

EXAMPLE 1

In a high-frequency sputtering apparatus, the quartz vibrator plate of a film thickness meter using a quartz vibrator was used as a substrate, square pieces of Gd and Tb having each side as long as 5 mm arranged on Fe having a diameter of 4 inches was used as a first target and an alloy of 40% Cr and 60% Ni having a diameter of 4 inches was used as a second target. The interior of the chamber was evacuated until $1.5 \times 10^{-5}$ Pa or less was reached, whereafter Ar gas was introduced thereinto up to $4 \times 10^{-1}$ Pa, and the Ar pressure was rendered to 3Pa by operating the main valve of the evacuating system. From a high-frequency power source, a constant sputter power 250 W was applied to the first target and different sputter powers were applied to the second target at a time, whereby GdTbFeNiCr films of the following various compositions having a thickness of 0.2 μm were prepared:

TABLE 1

Composition

| | | |
|---|---|---|
| Sample | 1-1: | {(Gd0.5Tb0.5)0.21Fe0.79}0.95-(Ni0.6Cr0.4)0.05 |
| Sample | 1-2: | {(Gd0.5Tb0.5)0.21Fe0.79}0.90-(Ni0.6Cr0.4)0.10 |
| Sample | 1-3: | {(Gd0.5Tb0.5)0.21Fe0.79}0.85-(Ni0.6Cr0.4)0.15 |
| Sample | 1-4: | {(Gd0.5Tb0.5)0.21Fe0.79}0.80-(Ni0.6Cr0.4)0.20 |

Also, by a similar apparatus, an alloy film of the following composition which does not contain Cr was prepared:

Sample 1-5: {(Gd0.5Tb0.5)0.21Fe0.79}0.97Ni0.03

It has been found as a result of X-ray diffraction that these films are films.

The result of the corrosion resistance test carried out with alloy films of the above-described constructions placed in a thermo-hygrostat of 80° C. and 85% RH is shown in FIG. 1. In FIG. 1, the ordinate represents the increment of the weight of the medium measured at an arbitrary measure by utilization of a film thickness meter using a quartz vibrator, and the abscissa represents the number of days, i.e., the time during which the alloy was left in the thermo-hygrostat. FIG. 1 shows that the corrosion progressed more as the weight increased. In FIG. 1, reference numerals are the same as the numbers of the samples. For comparison, a corrosion resistance test was carried out on magneto-optical recording mediums of the conventional compositions under the same conditions, and curve 17 shows the example of GdTbFe and curve 18 shows the example of GdTbFeCr. In the case of a GdTbFe film which did not contain Ni and Cr, the metal luster almost disappeared and the metal was completely corroded after the lapse of a day, while it has been found that as the amount of Ni and Cr becomes greater, the increment of weight, namely, the degree of oxidation is smaller and the corrosion resistance is improved. Also, it has been found that the GdTbFe film is more excellent in corrosion resistance than a GdTbFeCr film. Further, in the case of a GdTbFeNiCr film, even if the amount of Ni and Cr became greater, the decrease rate of the Kerr rotation angle related to the reading-out efficiency was small, e.g. about 18% for sample 1-4.

EXAMPLE 2

GdTbFeNiCr films of the following various compositions having a thickness of 0.2 μm were prepared with an alloy of 20% Cr-80% Ni used as the second target and with the other conditions remaining similar to those of Example 1:

TABLE 2

Composition

| | | |
|---|---|---|
| Sample | 2-1: | {(Gd0.5Tb0.5)0.21Fe0.79}0.95-(Ni0.8Cr0.2)0.05 |
| Sample | 2-2: | {(Gd0.5Tb0.5)0.21Fe0.79}0.90-(Ni0.8Cr0.2)0.10 |
| Sample | 2-3: | {(GD0.5Tb0.5)0.21Fe0.79}0.85-(Ni0.8Cr0.2)0.15 |
| Sample | 2-4: | {(Gd0.5Tb0.5)0.21Fe0.79}0.80-(Ni0.8Cr0.2)0.20 |

It has been found as a result of X-ray diffraction that these films are amorphous.

Figure 2:
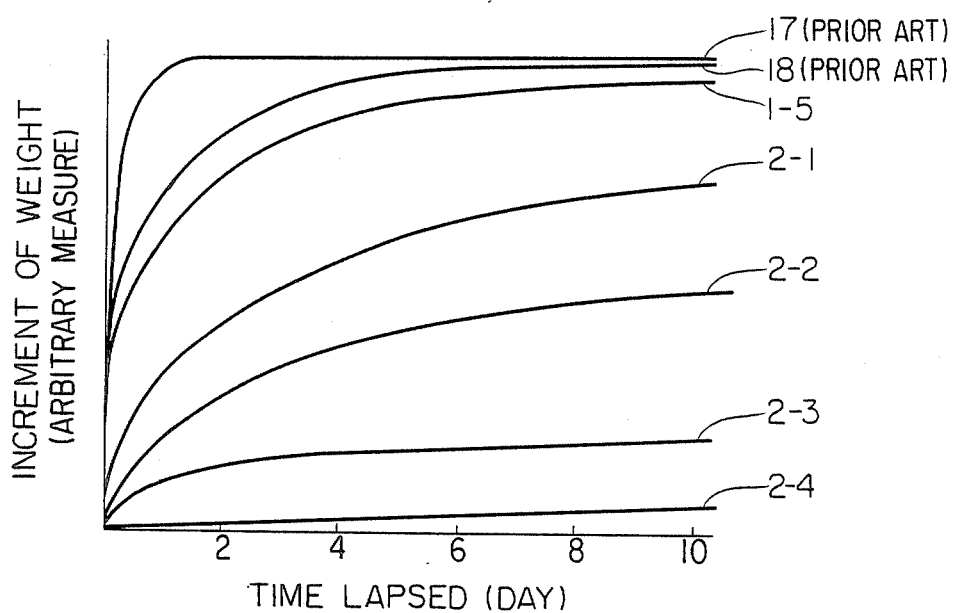

The result of the corrosion resistance test carried out with the GdTbFeNiCr films of the above-described constructions placed in the same thermo-hygrostat of 80° C. and 85% RH as that used in Example 1 is shown in FIG. 2. In FIG. 2, reference numerals are the same as the numbers of the samples and the same comparison examples as those in FIG. 1 and the result of sample 1-5 are also shown. In this Example, as in Example 1, it has been found that the corrosion resistance is improved more than in GdTbFe or GdTbFeCr. Further, the decrease rate of the Kerr rotation angle representative of the reading-out efficiency was smaller in Example 1, and was about 10% in sample 2-4.

EXAMPLE 3

50% Gd-50% Tb pieces having each side as long as 5 mm uniformly arranged on 30% Co-70% Fe were used as the first target and an alloy of 40% Cr-60% Ni was used as the second target to prepare GdTbFeCoNiCr films of the following various compositions having a thickness of 0.2 μm similarly to Example 1.

TABLE 3

Composition

Sample 3-1: {(Gd0.5Tb0.5)0.22(Fe0.7Co0.3)0.78}0.95-(Ni0.6Cr0.4)0.05
Sample 3-2: {(Gd0.5Tb0.5)0.22(Fe0.7Co0.3)0.78}0.90-(Ni0.6Cr0.4)0.10
Sample 3-3: {(Gd0.5Tb0.5)0.22(Fe0.7Co0.3)0.78}0.85-(Ni0.6Cr0.4)0.15
Sample 3-4: {(Gd0.5Tb0.5)0.22(Fe0.7Co0.3)0.78}0.80-(Ni0.6Cr0.4)0.20

It has been found as a result of X-ray diffraction that these films are amorphous.

Figure 3:
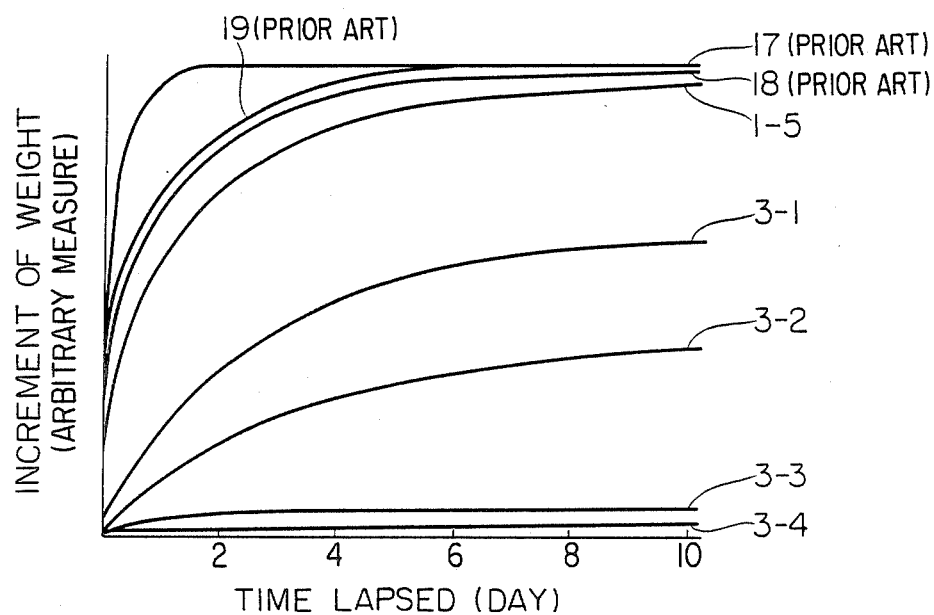
FIGS. 3 and 4 are graphs showing the results of the corrosion resistance test of embodiments of the present invention which comprise a GdTbFeCoNiCr film.

The result of the corrosion resistance test carried out with the films of the above-described constructions placed in a thermo-hygrostat of 80° C. and 85% RH similarly to Example 1 is shown in FIG. 3. In FIG. 3, reference numerals are the same as the numbers of the samples, and the same comparison examples as those in FIG. 1 and the result of sample 1-5 are shown and further, the result of the corrosion resistance test carried out on a magneto-optical recording medium formed of GdTbCo under the same conditions is shown as a curve 19.

It has been found that a GdTbFeCoNiCr film is improved in corrosion resistance over a GdTbFeCo film and is more excellent in corrosion resistance than GdTbFe and GdTbFeCr films. Also, the decrease rate of the Kerr rotation angle was about 12% in sample 3-4.

EXAMPLE 4

GdTbFeCoNiCr films of the following various compositions having a thickness of 0.2 μm were prepared with an alloy of 20% Cr-80% Ni used as the second target and with the other conditions remaining similar to those in Example 1:

TABLE 4

Composition

Sample 4-1: {(Gd0.5Tb0.5)0.22(Fe0.7Co0.3)0.78}0.95-(Ni0.8Cr0.2)0.05
Sample 4-2: {(Gd0.5Tb0.5)0.22(Fe0.7Co0.3)0.78}0.90-(Ni0.8Cr0.2)0.10
Sample 4-3: {(Gd0.5Tb0.5)0.22(Fe0.7Co0.3)0.78}0.85-(Ni0.8Cr0.2)0.15
Sample 4-4: {(Gd0.5Tb0.5)0.22(Fe0.7Co0.3)0.78}0.80-(Ni0.8Cr0.2)0.20

It has been found as a result of X-ray diffraction that these films are amorphous.

Figure 4:
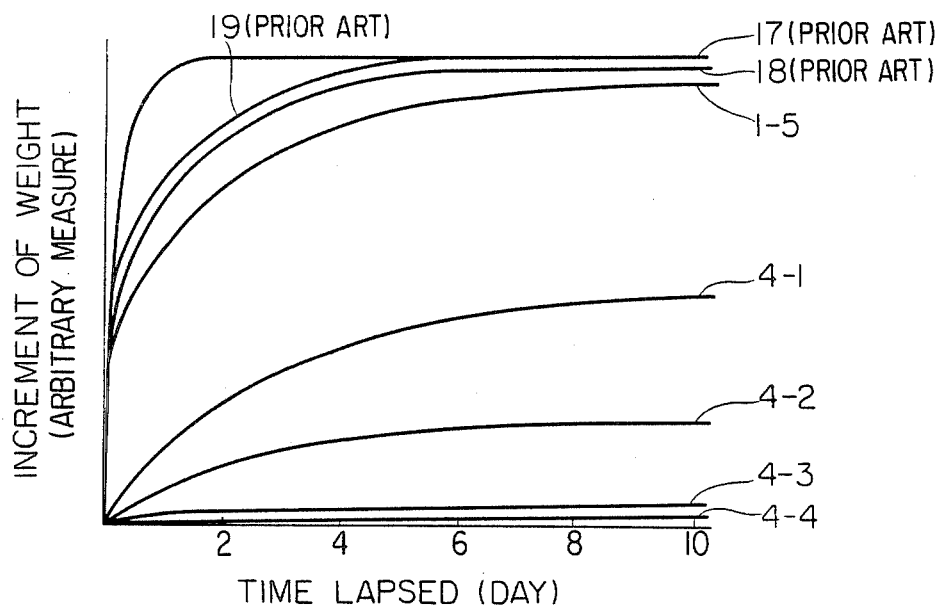

The result of the corrosion resistance test carried out with the films of the above-described constructions placed in a thermo-hygrostat of 80° C. and 85%RH similarly to Example 1 is shown in FIG. 4. In FIG. 4, reference numerals are the same as the numbers of the samples, and the same comparison examples as those in FIG. 3 and the result of sample 1-5 are also shown. According to the present Example, it has been found that GdTbFeCoNiCr films in which the ratio of Ni to Cr is Ni/Cr=8/2 are more increased in durability than Example 3. Also, the decrease rate of the Kerr rotation angle was smaller than that in Example 3 and was about 7% in sample 4-4.

EXAMPLE 5

In a high-frequency sputtering apparatus, the quartz vibrator plate of a film thickness meter using a quartzs vibrator was used as a substrate, Tb pieces having each side as long as 5 mm uniformly arranged on a plate of 30% Co-70% Fe having a diameter of 4 inches was used as a first target, and an alloy of 40% Cr-60% Ni was used as a second target. The interior of the chamber was evacuated until $1.5 \times 10^{-5}$ Pa or less was reached, whereafter Ar gas was introduced thereinto up to $4 \times 10^{-1}$ Pa, and the Ar pressure was rendered to 3Pa by operating the main valve of the evacuating system. At this time, a voltage was input to the substrate side from an rf power source so that the self-bias voltage was 80 volts. In this manner (other conditions being the same as those of Example 1), TbFeCoNiCr films of the following various compositions having a thickness of 0.2 μm were prepared:

TABLE 5

Composition

Sample 5-1: {Tb0.18(Fe0.7Co0.3)0.82}0.95-(Ni0.6Cr0.4)0.05
Sample 5-2: {Tb0.18(Fe0.7Co0.3)0.82}0.90-(Ni0.6Cr0.4)0.10
Sample 5-3: {Tb0.18(Fe0.7Co0.3)0.82}0.85-(Ni0.6Cr0.4)0.15
Sample 5-4: {Tb0.18(Fe0.7Co0.3)0.82}0.80-(Ni0.6Cr0.4)0.20

It has been found as a result of X-ray diffraction that these films are amorphous.

Figure 5:
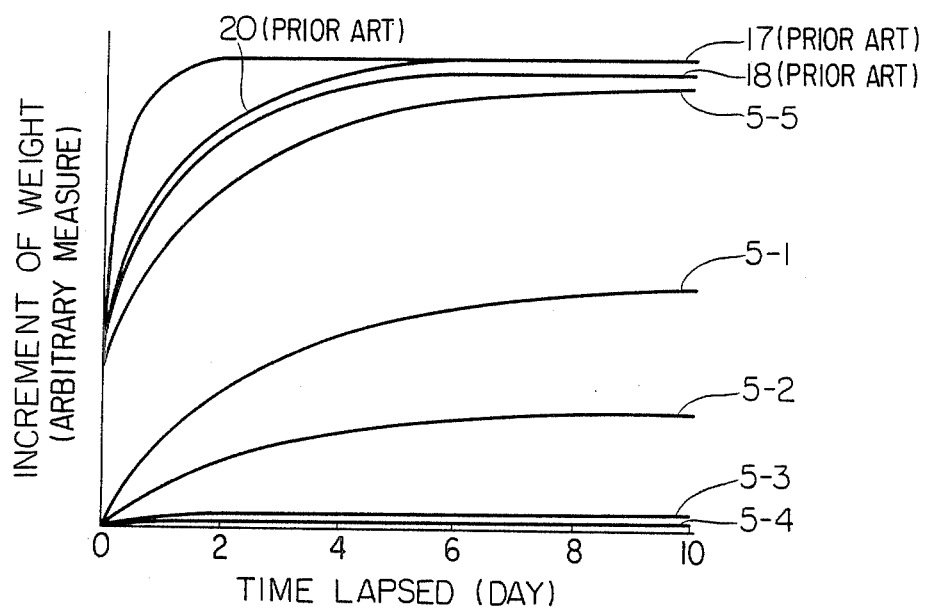
FIGS. 5 to 7 are graphs showing the results of the corrosion resistance tests of embodiments of the present invention which comprise a TbFeCoNiCr film.

The result of the corrosion resistance test carried out with the alloy films of the above-described constructions placed in the same thermo-hygrostat of 80° C. and 85%RH as that used in Example 1 is shown in FIG. 5. In FIG. 5, reference numerals are the same as the numbers of the samples. The same comparison examples as those in Example 1 and an example of FbFeCo as 20 are also shown.

According to the present Example, it has been found that the TbFeCoNiCr film is particularly improved in corrosion resistance as compared with the TbFeCo film which does not contain Ni and Cr. It has also been found that the TbFeCoNiCr film is more excellent in corrosion resistance than the conventional GdTbFe and GdTbFeCr films. Further, in the TbFeCoNiCr film, even if the amount of Ni and Cr became greater, the decrease rate of the Kerr rotation angle related to the reading-out efficiency was small and was about 10% in sample 5-4.

EXAMPLE 6

Films were made in the same manner as in Example 5. In this case, the self-bias voltage of the substrate was zero and TbFeCoNiCr films of the following various composition having a thickness of 0.2 μm were prepared:

TABLE 6

Composition

Sample 6-1: {Tb0.18(Fe0.7Co0.3)0.82}0.95-(Ni0.6Cr0.4)0.05
Sample 6-2: {Tb0.18(Fe0.7Co0.3)0.82}0.90-(Ni0.6Cr0.4)0.10
Sample 6-3: {Tb0.18(Fe0.7Co0.3)0.82}0.85-(Ni0.6Cr0.4)0.15
Sample 6-4: {Tb0.18(Fe0.7Co0.3)0.82}0.80-(Ni0.6Cr0.4)0.20

It has been found as a result of X-ray diffraction that these films are amorphous.

Figure 6:
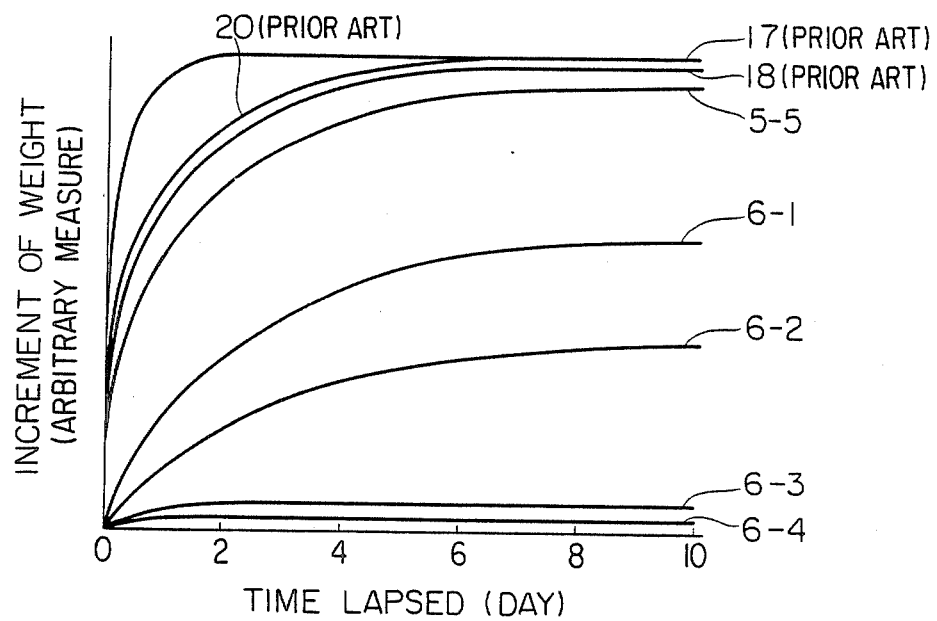

The reslt of the corrosion resistance test carried out with these films placed in a thermo-hygrostat of 80° C. and 85% similarly to Example 1 is shown in FIG. 6. Again in FIG. 6, reference numerals are the same as the numbers of the samples, and the same comparison examples as those in FIG. 5 and the result of sample 5-5 are also shown.

Again in this Example, it has been found that the TbFeCoNiCr film is more excellent in corrosion resistance than GdTbFe, GdTbFeCr and TbFeCo films.

Also, the decrease rate of the Kerr rotation angle was about 13% after ten days in sample 6-4. Also, in the present Example, the bias voltage was zero during the making of the films and therefore, a remarkable post-like construction appeared, and as compared with Example 5, density was small and corrosion was fast. From this, it has been found that the corrosion resistance is more improved if films are made with a bias voltage applied to the material.

EXAMPLE 7

In Example 6, an alloy of 20% Cr-80% Ni was used as a second target and films were made with the other conditions remaining similar to those in Example 6. In this manner, TbFeCoNiCr films of the following various compositions having a thickness of 0.2 μm were prepared:

TABLE 7

Composition

Sample 7-1: {Tb0.17(Fe0.7Co0.3)0.83}0.95-(Ni0.8Cr0.2)0.05
Sample 7-2: {Tb0.17(Fe0.7Co0.3)0.83}0.90-(Ni0.8Cr0.2)0.10
Sample 7-3: {Tb0.17(Fe0.7Co0.3)0.83}0.85-(Ni0.8Cr0.2)0.15
Sample 7-4: {Tb0.17(Fe0.7Co0.3)0.83}0.80-(Ni0.8Cr0.2)0.20

It has been found as a result of X-ray diffraction that these films are amorphous.

Figure 7:
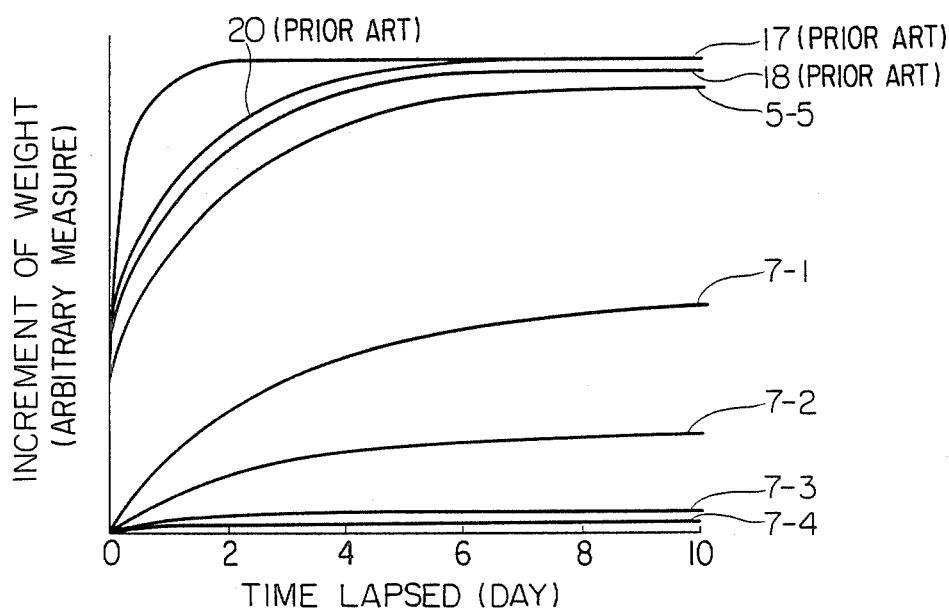

The result of the corrosion resistance test carried out with the films of the foregoing compositions placed in a thermo-hygrostat of 85° C. and 85%RH similarly to Example 1 is shown in FIG. 7. Again in FIG. 7, reference numerals are the same as the numbers of the samples, and the same comparison examples as those in FIG. 5 and the result of sample 5-5 are also shown.

Again in the present Example, it has been found that the TbFeCoNiCr film is more improved in corrosion resistance than GdTbFe, TbFeCo and GdTbFeCr films. Also, the decrease rate of the Kerr rotation angle was about 8% in sample 7-4 after the lapse of ten days.

EXAMPLE 8

In a high-frequency sputtering apparatus, a white glass plate having each side as long as 3 inches was used as a substrate, Gd, Tb and Co pieces having each side as long as 5 mm uniformly arranged on Fe having a diameter of 4 inches were used as a first target, and Ni having a diameter of 4 inches was used as a second target.

The interior of the apparatus was evacuated to $1.5 \times 10^{-5}$ Pa or less, whereafter Ar gas was introduced thereinto up to $4 \times 10^{-1}$ Pa, and the Ar pressure was rendered to 3Pa by operating the main valve of the evacuating system. By a high-frequency power source, a constant sputter power 250W was applied to the first target and different sputter powers were applied to the second target at a time, whereby GdTbFeCoNi films of the following various compositions were prepared on the substrate:

TABLE 8

Composition

Sample 8-1: {(Gd0.5Tb0.5)0.21(Fe0.9Co0.1)0.79}0.997Ni0.003
Sample 8-2: {(Gd0.5Tb0.5)0.21(Fe0.9Co0.1)0.79}0.99Ni0.01
Sample 8-3: {(Gd0.5Tb0.5)0.21(Fe0.9Co0.1)0.79}0.95Ni0.05
Sample 8-4: {(Gd0.5Tb0.5)0.21(Fe0.9Co0.1)0.79}0.9Ni0.1
Sample 8-5: {(Gd0.5Tb0.5)0.21(Fe0.9Co0.1)0.79}0.85Ni0.15
Sample 8-6: {(Gd0.5Tb0.5)0.21(Fe0.9Co0.1)0.79}0.80Ni0.2

The foregoing GdTbFeCoNi films and the GdTbFeCo films (comparison examples) were subjected to a corrosion resistance test in a thermo-hygrostat of 55° C. and 75%. The result of the test is shown in FIG. 8.

Figure 8:
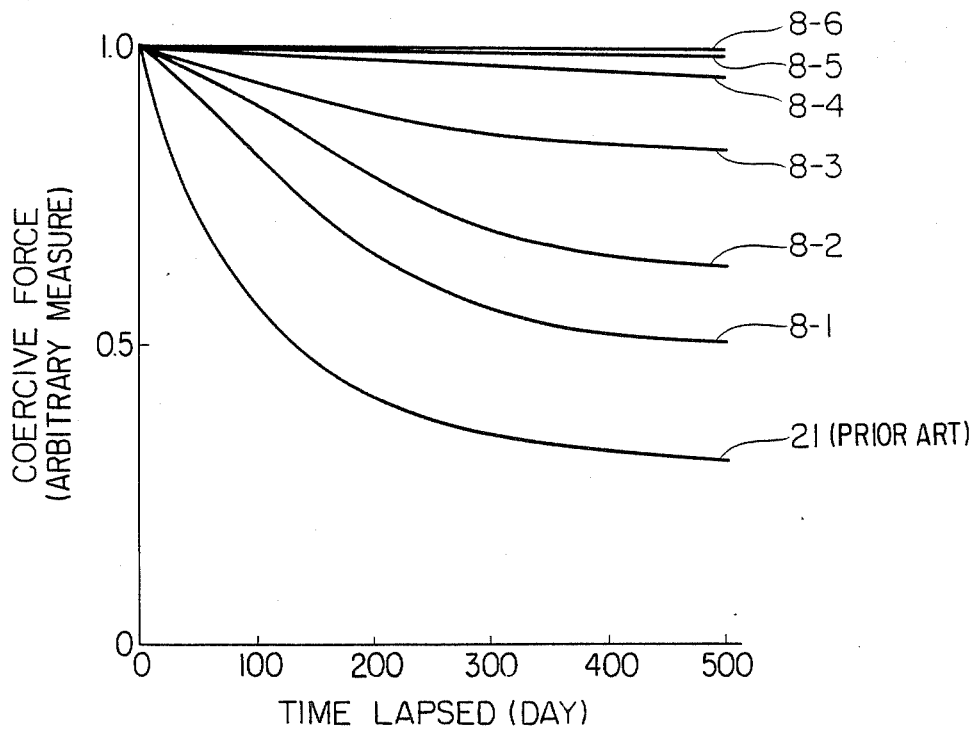
FIG. 8 is a graph showing the result of the corrosion resistance test of an embodiment of the present invention which comprises a GdTbFeCoNi film.

In FIG. 8, the ordinate represents the ratio of the coercive force to the initial value at arbitrary measure and the abscissa represents the time lapse, and the decrease in the coercive force shows the progress of corrosion. The data of the respective samples as indicated by the same reference numerals as the numbers of the samples, and reference numeral 21 indicates, for the sake of comparison, the prior art example for the GdTbFeCo films to which Ni is not added.

As is apparent from FIG. 8, the GdTbFeCo film which did not contain Ni exhibited a remarkable reduction in the coercive force in about 200 hours. As the Ni content in GdTbFeCo increases, the decrease in the coercive force is smaller and the corrosion resistance increases. Also, an amorphous magnetic film is liable to cause a structural change such as crystallization at a relatively low temperature and its characteristics as a magneto-optical material is sometimes injured, but by the addition of Ni, the crystallization temperature was increased and the thermal stability was improved.

EXAMPLE 9

In the same manner as Example 1 with the exception that the number of the Gd and Tb pieces arranged on the first target was changed, GdTbFeNiCr films of the following various compositions were prepared. Then, these films and the GdTbFe film similarly prepared as a comparison example were subjected to a corrosion resistance test similar to that carried out in Example 1.

The increments of weight after four days in the present Example by this test will be shown below together with the following compositions, as the comparative values when the increment of weight after four days in the GdTbFe film is 100.

TABLE 9

| | Composition | Increment of weight |
|---|---|---|
| Sample 9-1: | {(Gd0.05Tb0.95)0.21Fe0.79}0.90 (Ni0.6Cr0.4)0.10 | 55 |
| Sample 9-2: | {(Gd0.10Tb0.90)0.21Fe0.79}0.90 (Ni0.6Cr0.4)0.10 | 50 |
| Sample 9-3: | {(Gd0.90Tb0.10)0.21Fe0.79}0.90 (Ni0.6Cr0.4)0.10 | 50 |
| Sample 9-4: | {(Gd0.50Tb0.50)0.10Fe0.90}0.90 (Ni0.6Cr0.4)0.10 | 40 |
| Sample 9-5: | {(Gd0.50Tb0.50)0.15Fe0.85}0.90 (Ni0.6Cr0.4)0.10 | 45 |
| Sample 9-6: | {(Gd0.50Tb0.50)0.25Fe0.75}0.90 (Ni0.6Cr0.4)0.10 | 50 |
| Sample 9-7: | {(Gd0.50Tb0.50)0.30Fe0.70}0.90 (Ni0.6Cr0.4)0.10 | 50 |
| Sample 9-8: | {(Gd0.50Tb0.50)0.35Fe0.65}0.90 (Ni0.6Cr0.4)0.10 | 55 |

EXAMPLE 10

In Example 1, an alloy of 90%CR-10%Ni, an alloy of 80%Cr-20%Ni and an alloy of 5%Cr-95%Ni were used as the second target and the other conditions were similar to those in Example 1, whereby GdTbFeNiCr films of the following various compositions were prepared. These films were subjected to a corrosion resistance test similar to that carried out in Example 1, and the result of the test will be shown below similarly to Example 9.

TABLE 10

| | Composition | Increment of weight |
|---|---|---|
| Sample 10-1: | {(Gd0.50Tb0.50)0.21Fe0.79}0.90 (Ni0.05Cr0.95)0.10 | 60 |
| Sample 10-2: | {(Gd0.50Tb0.50)0.21Fe0.79}0.90 (Ni0.20Cr0.80)0.10 | 55 |
| Sample 10-3: | {(Gd0.50Tb0.50)0.21Fe0.79}0.90 (Ni0.90Cr0.10)0.10 | 45 |

EXAMPLE 11

In Example 1, an alloy of 30%Cr-70%Fe was used as the first target, the number of the Gd and Tb pieces arranged thereon was changed and the other conditions were similar to those in Example 1, whereby GdTeFeCoNiCr films of the following various compositions were prepared. Then, these films and the GdTbFeCo film similarly prepared as a comparison example were subjected to a corrosion resistance test similar to that carried out in Example 1. The increments of weight after four days in the present Example by this test will be shown below together with the following compositions, as the comparative values when the increment of weight after four days in the GdTbFeCo film is 100.

TABLE 11

| | Composition | Increment of weight |
|---|---|---|
| Sample 11-1: | {(Gd0.05Tb0.95)0.22(Fe0.70Co0.30)0.78} 0.90(Ni0.60Cr0.40)0.10 | 35 |
| Sample 11-2: | {(Gd0.10Tb0.90)0.22(Fe0.70Co0.30)0.78} 0.90(Ni0.60Cr0.40)0.10 | 30 |
| Sample 11-3: | {(Gd0.90Tb0.10)0.22(Fe0.70Co0.30)0.78} 0.90(Ni0.60Cr0.40)0.10 | 30 |

TABLE 11-continued

| | Composition | Increment of weight |
|---|---|---|
| Sample 11-4: | {(Gd0.50Tb0.50)0.10(Fe0.70Co0.30)0.90} 0.90(Ni0.60Cr0.40)0.10 | 25 |
| Sample 11-5: | {(Gd0.50Tb0.50)0.15(Fe0.70Co0.30)0.85} 0.90(Ni0.60Cr0.40)0.10 | 25 |
| Sample 11-6: | {(Gd0.50Tb0.50)0.25(Fe0.70Co0.30)0.75} 0.90(Ni0.60Cr0.40)0.10 | 30 |
| Sample 11-7: | {(Gd0.50Tb0.50)0.30(Fe0.70Co0.30)0.70} 0.90(Ni0.60Cr0.40)0.10 | 30 |
| Sample 11-8: | {(Gd0.50Tb0.50)0.35(Fe0.70Co0.30)0.65} 0.90(Ni0.60Cr0.40)0.10 | 35 |

EXAMPLE 12

FeCo alloys of various compositions were used as the first target in Example 1 and the other conditions were similar to those in Example 1, whereby GdTbFeCoNiCr films of the following various compositions were prepared. These films were subjected to a corrosion resistance test similar to that carried out in Example 1, and the result of the test will be shown below similarly to Example 11.

TABLE 12

| | Composition | Increment of weight |
|---|---|---|
| Sample 12-1: | {(Gd0.50Tb0.50)0.22(Fe0.95Co0.05)0.78} 0.90(Ni0.60Cr0.40)0.10 | 35 |
| Sample 12-2: | {(Gd0.50Tb0.50)0.22(Fe0.90Co0.10)0.78} 0.90(Ni0.60Cr0.40)0.10 | 35 |
| Sample 12-3: | {(Gd0.50Tb0.50)0.22(Fe0.80Co0.20)0.78} 0.90(Ni0.60Cr0.40)0.10 | 30 |
| Sample 12-4: | {(Gd0.50Tb0.50)0.22(Fe0.60Co0.40)0.78} 0.90(Ni0.60Cr0.40)0.10 | 30 |
| Sample 12-5: | {(Gd0.50Tb0.50)0.22(Fe0.50Co0.50)0.78} 0.90(Ni0.60Cr0.40)0.10 | 25 |
| Sample 12-6: | {(Gd0.50Tb0.50)0.22(Fe0.35Co0.65)0.78} 0.90(Ni0.60Cr0.40)0.10 | 20 |
| Sample 12-7: | {(Gd0.50Tb0.50)0.22(Fe0.20Co0.80)0.78} 0.90(Ni0.60Cr0.40)0.10 | 15 |

EXAMPLE 13

In Example 1, an alloy of 30% Co-70% Fe was used as the first target and an alloy of 90% Cr-10% Ni, an alloy of 80% Cr-20% Ni, an alloy of 5% Cr-95% Ni and 100% Ni were used as the second target and the other conditions were similar to those in Example 1, whereby GdTbFeNiCr films of the following various compositions and a GdTbFeNi film were prepared. These films were subjected to a corrosion resistance test similar to that carried out in Example 1, and the result of the test will be shown below similarly to Example 11.

TABLE 13

| | Composition | Increment of weight |
|---|---|---|
| Sample 13-1: | {(Gd0.50Tb0.50)0.22(Fe0.70Co0.30)0.78} 0.90(Ni0.05Cr0.95)0.10 | 40 |
| Sample 13-2: | {(Gd0.50Tb0.50)0.22(Fe0.70Co0.30)0.78} 0.90(Ni0.20Cr0.80)0.10 | 35 |
| Sample 13-3: | {(Gd0.50Tb0.50)0.22(Fe0.70Co0.30)0.78} 0.90(Ni0.90Cr0.10)0.10 | 25 |
| Sample 13-4: | {(Gd0.50Tb0.50)0.22(Fe0.70Co0.30)0.78} 0.90 Ni0.10 | 60 |

EXAMPLE 14

TbFeCoNiCr films of the following various compositions were prepared under the same conditions as in Example 5 with the exception that the number of the Tb pieces arranged on the first target was changed. Then, these films and the TbFeCo film similarly prepared as a comparison example were subjected to a corrosion resistance test similar to that carried out in Example 1. The increments of weight after four days in the present Example by this test will be shown below together with the following compositions, as the comparative values when the increment of weight after four days in the TbFeCo film is 100.

TABLE 14

| Composition | Increment of weight |
| --- | --- |
| Sample 14-1: {Tb0.10(Fe0.70Co0.30)0.90}0.90(Ni0.60Cr0.40)0.10 | 30 |
| Sample 14-2: {Tb0.15(Fe0.70Co0.30)0.85}0.90(Ni0.60Cr0.40)0.10 | 35 |
| Sample 14-3: {Tb0.25(Fe0.70Co0.30)0.75}0.90(Ni0.60Cr0.40)0.10 | 40 |
| Sample 14-4: {Tb0.30(Fe0.70Co0.30)0.70}0.90(Ni0.60Cr0.40)0.10 | 40 |
| Sample 14-5: {Tb0.35(Fe0.70Co0.30)0.65}0.90(Ni0.60Cr0.40)0.10 | 45 |

EXAMPLE 15

In Example 5, FeCo alloys of various compositions and a Tb piece were used as the first target or Tb pieces and Co pieces each having each side as long as 5 mm arranged on Fe were used as the first target and the other conditions were similar to those in Example 5, whereby TbFeCoNiCr films of the following various compositions were prepared. These films were subjected to a corrosion resistance test similar to that carried out in Example 1, and the result of the test will be shown below similarly to Example 14.

TABLE 15

| Composition | Increment of weight |
| --- | --- |
| Sample 15-1: {Tb0.17(Fe0.99Co0.01)0.83}0.90(Ni0.60Cr0.40)0.10 | 45 |
| Sample 15-2: {Tb0.17(Fe0.90Co0.10)0.83}0.90(Ni0.60Cr0.40)0.10 | 40 |
| Sample 15-3: {Tb0.17(Fe0.80Co0.20)0.83}0.90(Ni0.60Cr0.40)0.10 | 35 |
| Sample 15-4: {Tb0.17(Fe0.60Co0.40)0.83}0.90(Ni0.60Cr0.40)0.10 | 35 |
| Sample 15-5: {Tb0.17(Fe0.50Co0.50)0.83}0.90(Ni0.60Cr0.40)0.10 | 30 |
| Sample 15-6: {Tb0.17(Fe0.35Co0.65)0.83}0.90(Ni0.60Cr0.40)0.10 | 25 |
| Sample 15-7: {Tb0.17(Fe0.20Co0.80)0.83}0.90(Ni0.60Cr0.40)0.10 | 25 |

EXAMPLE 16

In Example 5, an alloy of 90% Cr-10% Ni, an alloy of 80% Cr-20% Ni and an alloy of 5% Cr-95% Ni were used as the second target and the other conditions were similar to those in Example 5, whereby TbFeCoNiCr films of the following various compositions were prepared. These films were subjected to a corrosion resistance test similar to that carried out in Example 1, and the result of the test will be shown below similarly to Example 14.

TABLE 16

| Composition | Increment of weight |
| --- | --- |
| Sample 16-1: {Tb0.17(Fe0.70Co0.30)0.83}0.90(Ni0.05Cr0.95)0.10 | 45 |
| Sample 16-2: {Tb0.17(Fe0.70Co0.30)0.83}0.90(Ni0.20Cr0.80)0.10 | 40 |
| Sample 16-3: {Tb0.17(Fe0.70Co0.30)0.83}0.90(Ni0.90Cr0.10 | 40 |

If a well-known protective layer or a antireflection layer serving also as a protective layer or a heat insulating layer is provided on the magneto-optical recording medium according to the present invention when the recording medium is laminated on a substrate such as glass, metal or plastic by the sputtering method of the embodiment or the vacuum evaporating method or the like, the corrosion resistance will be further improved. Of course, the corrosion resistance will also be improved if the recording medium is made into an air sandwich type construction enclosing inert gas therein as heretofore known.

We claim:

1. A magneto-optical recording medium having amorphous magnetic alloy film comprising the following composition and having a readily magnetizable axis in a direction perpendicular to the surface of the film:

$$\{(Gd_xTb_{1-x})_p(Fe_yCo_{1-y})_{1-p}\}_q(Ni_zCr_{1-z})_{1-q},$$

where $0 \leq x \leq 0.9$ $0.2 \leq y \leq 1.0$ $0.2 \leq z \leq 0.9$ $0.1 \leq p \leq 0.5$ $0.8 \leq 1-q \leq 0.95$ wherein said alloy film contains at least one of Gd and Co.

2. A magneto-optical recording medium according to claim 1, wherein the amount of Ni is within the range of 60-80 atomic % relative to the total amount of Ni and Cr.

3. A magneto-optical recording medium according to claim 1, wherein the amount of Gd and Tb is within the range of 15-30 atomic % relative to the total amount of Gd, Tb, Fe and Co.

* * * * *

UNITED STATES PATENT AND TRADEMARK OFFICE
CERTIFICATE OF CORRECTION

PATENT NO. : 4,734,334            Page 1 of 3

DATED : March 29, 1988

INVENTOR(S) : MASAAKI MATSUSHIMA, ET AL.

It is certified that error appears in the above-identified patent and that said Letters Patent is hereby corrected as shown below:     Title page:

<u>AT [30] IN FOREIGN APPLICATION PRIORITY DATA</u>

"58-2107833" should read --58-207833--.

<u>COLUMN 1</u>

Line 22, "of" should be deleted.

<u>COLUMN 2</u>

Line 40, "$\{(Gd_xTb_{1-x})_p(Fe_yCo_{1-y})_{1-p}\}_q Ni_zCr_{1-z})_{1-p'}$," should read
--$\{(Gd_xTb_{1-x})_p(Fe_yCo_{1-y})_{1-p}\}_q(Ni_zCr_{1-z})_{1-p'}$--.

Line 48, "severe" should read --harsh--.

Line 67, "perpendicularly" should read --a perpendicularly--.

<u>COLUMN 3</u>

Line 14, "rnage" should read --range--.

Line 60, "at a time," should read --individually--.

<u>COLUMN 4</u>

Line 12, "are films." should read --are amorphous films.--.

Line 57, "$\{(GD0.5$" should read --$\{(Gd0.5$--.

UNITED STATES PATENT AND TRADEMARK OFFICE
CERTIFICATE OF CORRECTION

PATENT NO. : 4,734,334

DATED : March 29, 1988

INVENTOR(S) : MASAAKI MATSUSHIMA, ET AL.

It is certified that error appears in the above-identified patent and that said Letters Patent is hereby corrected as shown below:

COLUMN 6

Line 13, "quartzs" should read --quartz--.
    Line 50, "FbFeCo" should read --TbFeCo--.
    Line 50, "as 20" should read --as a curve 20--.

COLUMN 7

Line 18, "85%" should read --85% RH--.
    Line 37, "Example 6," should read --Example 7,--.

COLUMN 8

Line 16, "at a time," should read --individually--.
    Line 37, "75%." should read --75% RH.--.
    Line 43, "as" should read --are--.
    Line 46, "for" should read --of--.
    Line 47, "films" should read --film--.

COLUMN 9

Line 26, "Example 1," should read --Example 10,--.
    Line 46, "Example 1," should read --Example 11,--.

COLUMN 10

Line 17, "Example 1" should read --Example 12--.
    Line 43, "Example 1," should read --Example 13,--

UNITED STATES PATENT AND TRADEMARK OFFICE
CERTIFICATE OF CORRECTION

PATENT NO. : 4,734,334

DATED : March 29, 1988

INVENTOR(S) : MASAAKI MATSUSHIMA, ET AL.

It is certified that error appears in the above-identified patent and that said Letters Patent is hereby corrected as shown below:

COLUMN 11

Line 26, "Example 5," should read --Example 15,--.
Line 54, "Example 5," should read --Example 16,--.

COLUMN 12

Lines 15-16,
"Sample 16-3:
$\{Tb0.17(Fe0.70Co0.30)0.83\} 0.90(Ni0.90Cr0.10\quad\quad 40$"
should read
--Sample 16-3:
$\{Tb0.17(Fe0.70Co0.30)0.83\} 0.90(Ni0.90Cr0.10)0.10\quad\quad 40$"
Line 18, "a" (second occurrence) should read --an--.
Line 44, "$0.8 \leq 1-q \leq 0.95$" should read --$0.8 \leq q \leq 0.95$--.
Line 52, "amount" should read --total amount--.

Signed and Sealed this

Twenty-fourth Day of January, 1989

Attest:

DONALD J. QUIGG

Attesting Officer

Commissioner of Patents and Trademarks